US007254772B2

(12) United States Patent
Penke et al.

(10) Patent No.: US 7,254,772 B2
(45) Date of Patent: Aug. 7, 2007

(54) SYSTEMS AND METHODS FOR VISUALLY REPRESENTING THE AGING AND/OR EXPIRATION OF ELECTRONIC DOCUMENTS

(75) Inventors: Mark S. Penke, West Henrietta, NY (US); David Quijano, Houston, TX (US); Marc Krolczyk, Spencerport, NY (US)

(73) Assignee: Xerox Corporation, Stamford, CT (US)

( * ) Notice: Subject to any disclaimer, the term of this patent is extended or adjusted under 35 U.S.C. 154(b) by 483 days.

(21) Appl. No.: 10/207,104

(22) Filed: Jul. 30, 2002

(65) Prior Publication Data

US 2004/0025113 A1 Feb. 5, 2004

(51) Int. Cl.
*G06F 15/00* (2006.01)
*G06F 17/00* (2006.01)
(52) U.S. Cl. .................... 715/511; 715/512; 715/517
(58) Field of Classification Search ................ 715/511, 715/512, 517
See application file for complete search history.

(56) References Cited

U.S. PATENT DOCUMENTS

| 4,899,299 | A | * | 2/1990 | MacPhail ............... 707/204 |
|---|---|---|---|---|
| 5,107,419 | A | * | 4/1992 | MacPhail ................ 707/9 |
| 5,171,040 | A | * | 12/1992 | Orndorff ................ 283/93 |
| 5,532,715 | A | * | 7/1996 | Bates et al. ............. 345/684 |
| 5,559,942 | A | * | 9/1996 | Gough et al. ............ 715/802 |
| 5,577,188 | A | * | 11/1996 | Zhu ...................... 715/745 |
| 5,586,237 | A | * | 12/1996 | Baecker et al. .......... 345/670 |
| 6,044,462 | A | * | 3/2000 | Zubeldia et al. ......... 713/158 |
| 6,157,930 | A | * | 12/2000 | Ballard et al. ........... 707/203 |
| 6,367,013 | B1 | * | 4/2002 | Bisbee et al. ............ 713/178 |
| 6,430,455 | B1 | * | 8/2002 | Rebello et al. .......... 700/105 |
| 6,476,831 | B1 | * | 11/2002 | Wirth et al. ............. 715/784 |
| 6,493,732 | B2 | * | 12/2002 | Aoyama et al. .......... 715/511 |
| 6,564,257 | B1 | * | 5/2003 | Emens et al. ........... 709/219 |
| 6,567,107 | B1 | * | 5/2003 | Stannard ................ 715/764 |
| 6,606,639 | B2 | * | 8/2003 | Jacobson et al. ........ 707/201 |

(Continued)

FOREIGN PATENT DOCUMENTS

WO WO 98/58321 A1 * 6/1998

OTHER PUBLICATIONS

Neibauer, Alan, Running Microsoft Outlook 2000, Microsoft Press, Redmond, WA, © 1999, pp. 150-155, 320-325, 348-350, 389-392, 505-513 and 557-571.*

(Continued)

*Primary Examiner*—Shahid Alam
*Assistant Examiner*—Robert Stevens
(74) *Attorney, Agent, or Firm*—Oliff & Berridge, PLC (57) ABSTRACT

Systems and methods enforce an expiration date for an electronic document and represent the expiration visually. The author may specify an expiration date for an electronic document. The expiration date may be either a date stamp or an integer representing a period of time from the creation date. The access to the document may be unavailable to a user after the expiration date. The visual representation of the document may age after a milestone date is reached. Random pixels may be added to the visual representation until the document expires. An algorithm may apply visual metaphor bitmaps to the document's visual representation. The bitmaps may be templates. The document may be mapped to the applied bitmaps. The document may be rendered illegible after the expiration date is reached.

18 Claims, 10 Drawing Sheets

U.S. PATENT DOCUMENTS

| | | | |
|---|---|---|---|
| 6,718,351 B2* | 4/2004 | Sellen et al. | 707/203 |
| 6,742,119 B1* | 5/2004 | Peyravian et al. | 713/178 |
| 6,752,430 B2* | 6/2004 | Holt et al. | 283/72 |
| 6,826,534 B1* | 11/2004 | Gupta et al. | 705/1 |
| 6,959,308 B2* | 10/2005 | Gramsamer et al. | 707/200 |
| 2001/0017707 A1* | 8/2001 | Lee | 358/1.12 |
| 2001/0051962 A1* | 12/2001 | Plotkin | 707/522 |
| 2002/0002682 A1* | 1/2002 | Tsuchiyama et al. | 713/193 |
| 2002/0027674 A1* | 3/2002 | Tokunaga et al. | 358/1.14 |
| 2002/0029351 A1* | 3/2002 | Deng | 713/201 |
| 2002/0176114 A1* | 11/2002 | Zeller et al. | 358/3.28 |
| 2003/0009345 A1* | 1/2003 | Thorpe | 705/1 |
| 2003/0163724 A1* | 8/2003 | Tayebi et al. | 713/200 |
| 2003/0174857 A1* | 9/2003 | Yu | 382/100 |

OTHER PUBLICATIONS

Hill, William C., et al., "Edit Wear and Read Wear", CHI '92, May 3-7, 1992, pp. 3-9 [ACM 0-89791-513-5/92/0005-0003].*

Abiteboul, Serge, "On Views and XML", PODS '99, Philadelphia, PA, May 1999, pp. 1-9 [ACM 1-58113-062-7/99/05].*

Ströbel, Michael, "Communication Design for Electronic Negotiations on the Basis of XML Schema", WWW10, Hong Kong, May 1-5, 2001, pp. 9-20 [ACM 1-58113-348-0/01/0005].*

* cited by examiner

SYSTEMS AND METHODS FOR VISUALLY REPRESENTING THE AGING AND/OR EXPIRATION OF ELECTRONIC DOCUMENTS

BACKGROUND OF THE INVENTION

1. Field of Invention

This invention generally relates to systems and methods for visually representing electronic documents.

2. Description of Related Art

An electronic document is a file created by a software application. In addition to text, an electronic document can include graphics, charts, or other objects. Since electronic documents are not physical entities, they may remain in existence for as long as the computer system in which they have been saved remains active.

The extended lifetime of these documents engenders version-control problems in organizations utilizing digital document technology. For example, time-dependent documents, such as draft proposals for contracts, are frequency created in digital form. These draft documents may then be erroneously circulated as final contracts or final versions, despite the existence of more recent versions.

Several methods for the management of electronic document versions are currently in use. The document itself may be marked as "Draft" or "Concept" using standard text or watermarks. Alternatively, a document management system, such as DocuShare™ or Outlook™, may be configured to automatically delete electronic documents after a given time.

SUMMARY OF THE INVENTION

This invention provides systems and methods that limit the life of an electronic document.

This invention separately provides systems and methods that limit the life of an electronic document and represent an end of life visually.

This invention separately provides systems and methods that visually represent aging and/or expiration of an electronic document.

In various exemplary embodiments of the systems and methods according to the invention, an expiration date is set for an electronic document. A software component inserts an icon into the header of the visual representation of an electronic document. The icon defines the date authored and/or the expiration date. As the expiration date passes, the document expires. If the document is accessed after the expiration date, a dialog box is presented with information explaining the expiration of the document.

In various exemplary embodiments of the systems and methods according to the invention, an electronic document's visual representation changes to resemble crumpled and/or damaged paper as the expiration date approaches. When the expiration date is reached, the document becomes unreadable and a dialog box appears that instructs the user to contact the author for a recent version.

The various exemplary embodiments of the systems and methods according to the invention are intuitive and avoid confusion as to the most recent version of a draft document. Moreover, the embodiments provide adequate forewarning as to the impending deletion of an electronic document and thus prevents disruption of workflow and the loss of data.

These and other features and advantages of this invention are described in or are apparent from the following detailed description of exemplary embodiments of the apparatus/systems and methods according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

In various exemplary embodiments, the systems and methods according to this invention provide a visual representation of the aging and expiration of an electronic document. The systems and methods may be embodied in a computer program stored on a computer-readable storage medium, whose instructions direct a computer to perform the steps of the method. Various exemplary embodiments of this invention provide a method of limiting the life of an electronic document and representing this end of life visually.

Figure 1:
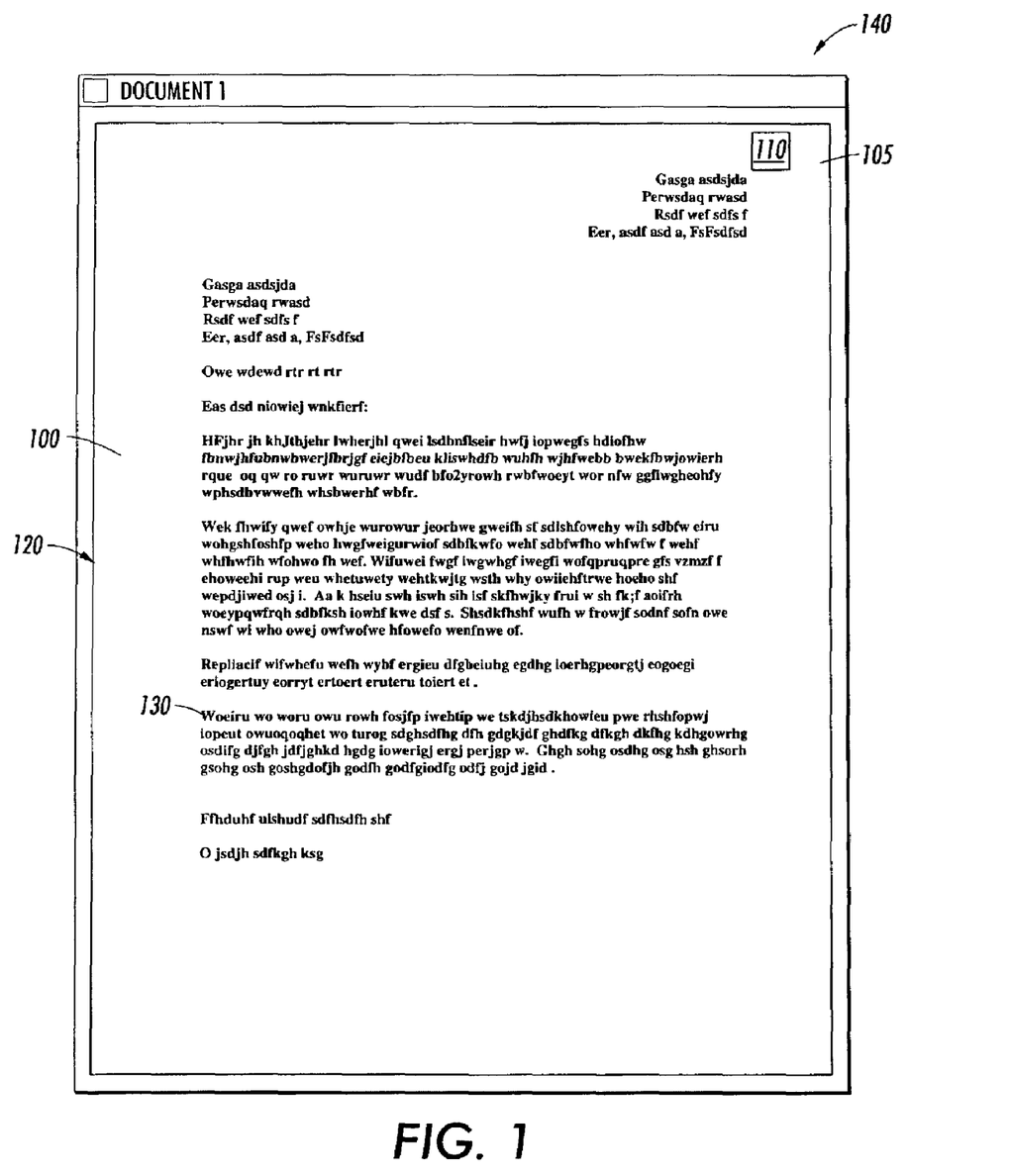
FIG. 1 illustrates a visual representation of an electronic document in accordance with various exemplary embodiments of the invention.

FIG. 1 illustrates a visual representation of an electronic document 100 in accordance with various embodiments of the invention. The document 100 is characterized by one or more edges 120 and one or more lines of text 130. In various exemplary embodiments, the electronic document 100 displays visual information, such as, for example, .gif files, bitmaps, and the like. In fact, the document 100 may display any visual information, either known or hereafter developed, that can be incorporated into an electronic document. In various embodiments of the invention, the document 100 contains an informational icon 110, as shown in FIG. 2, in the document header 105.

The document 100 is enclosed in a window 140. The window 140 may comprise any enclosed, rectangular area on a display screen in which an operating system implements a graphical user interface. The operating system may display different data in each window. Thus, the window 140 may display a document view in a word processor or a web browser.

Figure 2:
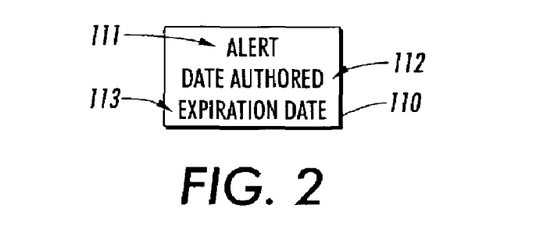
FIG. 2 shows an informational icon according to this invention.

FIG. 2 illustrates the informational icon 110 in accordance with various embodiments of the present invention. The informational icon 110 contains a visual alert 111. The visual alert 111 may be graphical in nature, for example, an iconic representation of an alarm clock. The graphical alert 111 may also be the presence of the icon 110 itself in the document 100. The informational icon 110 also contains a text field 112 indicating the creation date of the document 100. The informational icon 110 further contains a text field 113 indicative of the expiration date of the document 100. In addition to the date, fields 112 and 113 may contain a time indicator.

In various exemplary embodiments of this invention, the methods limiting the lifetime of an electronic document and visually representing this end of life are implemented as computer hardware or software routines.

Figure 3:
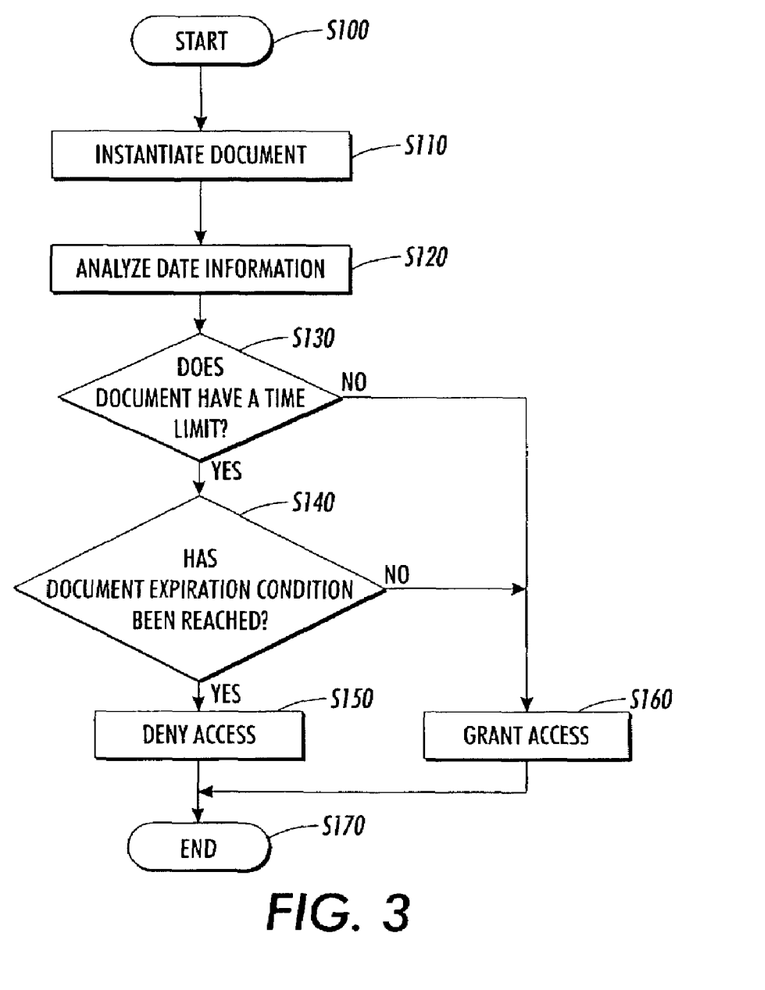
FIG. 3 is a flowchart outlining a first exemplary embodiment of a method according to this invention for limiting the life of an electronic document and representing this end of life visually.

FIG. 3 is a flowchart representing a method of limiting the life of an electronic document according to a first embodiment of the invention. As shown in FIG. 3, operation begins in step S100 and continues to step S110, where the electronic document is instantiated in a computer system. The document may be instantiated in computer memory, for example, RAM, and in some instances, in a temporary file on a disk drive.

Next, in step S120, date information associated with the electronic document is analyzed. In various exemplary embodiments, the date information includes the date and time the document was created, and the document's expiration date. The expiration time may be a system-wide constant, for example, 12:00 AM. This value may be stored in any suitable manner, for example, in a database on a networked computer. The expiration time may also be specific to each electronic document. In this configuration, the expiration time is also associated with the electronic document. In still other configurations, the expiration date may be determined algorithmically, based on the creation date and time and, for example, a separate integer variable indicating days to expiration from the creation date. Thus, a value of one in the expiration date field indicates that the document will expire one day from the creation date. Similarly, the document creation date may contain a time stamp indicative of the last day and time that the document was modified by the author.

Operation continues to step S130, where a determination is made as to whether the document has a time limit. In various exemplary embodiments, a negative determination is based on an expiration date value preceding the creation date value associated with the document. For example, an expiration value of Jan. 1, 1900 for a document created Jan. 1, 2001 indicates that the document does not expire. Alternatively, where the expiration date field contains an integer determining the number of days to expiration from the creation date, a negative value in this field indicates that the document has no expiration date.

If a negative determination is made in step S130, then operation jumps to step S160 where access to the document is granted. The process then ends at step S170.

If a positive determination is made at step S130, then operation continues to step S140 where a determination is made as to whether the document expiration condition has been reached. In various exemplary embodiments, the document expiration condition is reached when the system date and time exceeds the expiration date and time analyzed in step S120. In other embodiments, the document expiration condition is reached when a period of days has elapsed from the creation date, as determined by an integer value extracted in step S120.

If a negative determination is made in step S140, then operation jumps to step S160 where access to the document is granted. If a positive determination is made in step S140, then operation continues to step S150 where access to the document is denied. Operation then jumps to step S170 where the process ends.

Figure 4:
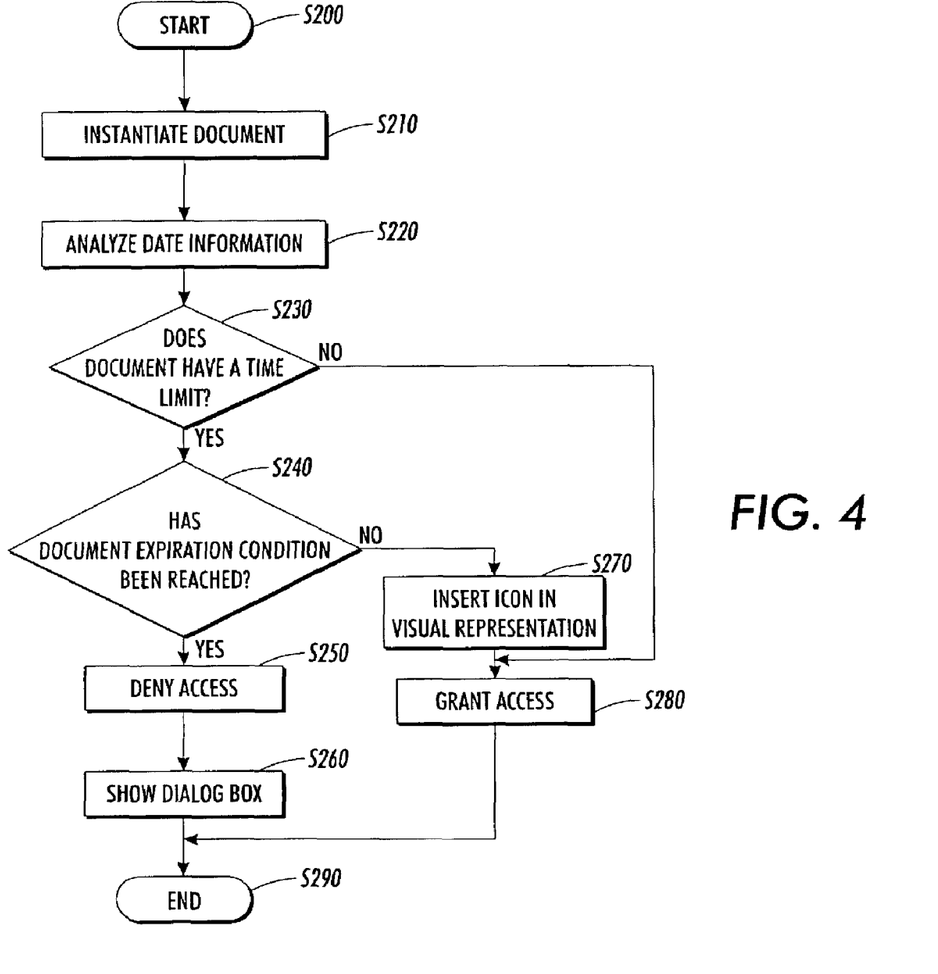
FIG. 4 is a flowchart outlining a second exemplary embodiment of a method according to this invention for limiting the life of an electronic document and representing this end of life visually.

FIG. 4 is a flowchart outlining a second exemplary embodiment of a method for limiting the life of an electronic document and representing this end of life visually. The method outlined in FIG. 4 is similar to that outlined in FIG. 3. As shown in FIG. 4, operation begins in step S200, and continues to step S210, where an electronic document is instantiated. Then, in step S220, date information associated with the electronic document is analyzed. Next, in step S230, a determination is made as to whether the document has a time limit. If a negative determination is made in step S230, then operation jumps to step S280 where access to the electronic document is granted. Then, the process ends in step S290.

If a positive determination is made in step S230, then operation continues to step S240 where a determination is made as to whether the document expiration condition has been reached. If a positive determination is made in step S240, then operation continues to step S250 where access to the electronic document is denied. Next, in step S260, an informational dialog box is shown to the user informing him of the expiration condition. Then, operation jumps to step S290 where the process ends.

If a negative determination is made in step S240, operation jumps to step S270 where an informational icon is inserted into the visual representation of the electronic document. Next, operation continues to step S280 where access to the electronic document is granted. Then the process ends in step S290.

Figure 5:
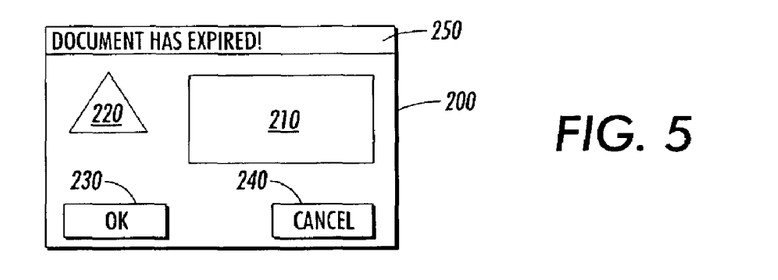
FIG. 5 shows an exemplary dialog box according to this invention.

FIG. 5 illustrates an example of a dialog box 200 in accordance with step S260 of FIG. 4 and various embodiments of the invention. Dialog box 200 is contained in a window 250. The dialog box 200 contains a text portion 210. In various embodiments of the invention, the text portion 210 explains that the document has expired. The text portion 210 may also instruct the user to contact the author for a recent document version. The dialog box 200 contains an icon 220 indicative of the informational or alert status of the text portion 210.

The dialog box 200 also contains an OK button 230. Clicking the OK button 230 closes the dialog box 200. In various exemplary embodiments of the invention, clicking the OK button 230 also launches the user's e-mail program so that the user may contact the author to obtain the latest version of the electronic document. Alternatively, clicking the OK button 230 may launch the user's internet telephone program and dial the telephone of the author of the electronic document 100. In still other embodiments, clicking the OK button 230 of the dialog box 200 may launch a computer software application presenting a number of contact options for the author of the electronic document. These contact options include, for example, e-mail and internet telephone options.

In various exemplary embodiments, the dialog box 200 contains a cancel button 240. Clicking the cancel button 240 closes the dialog without further action.

Figure 6:
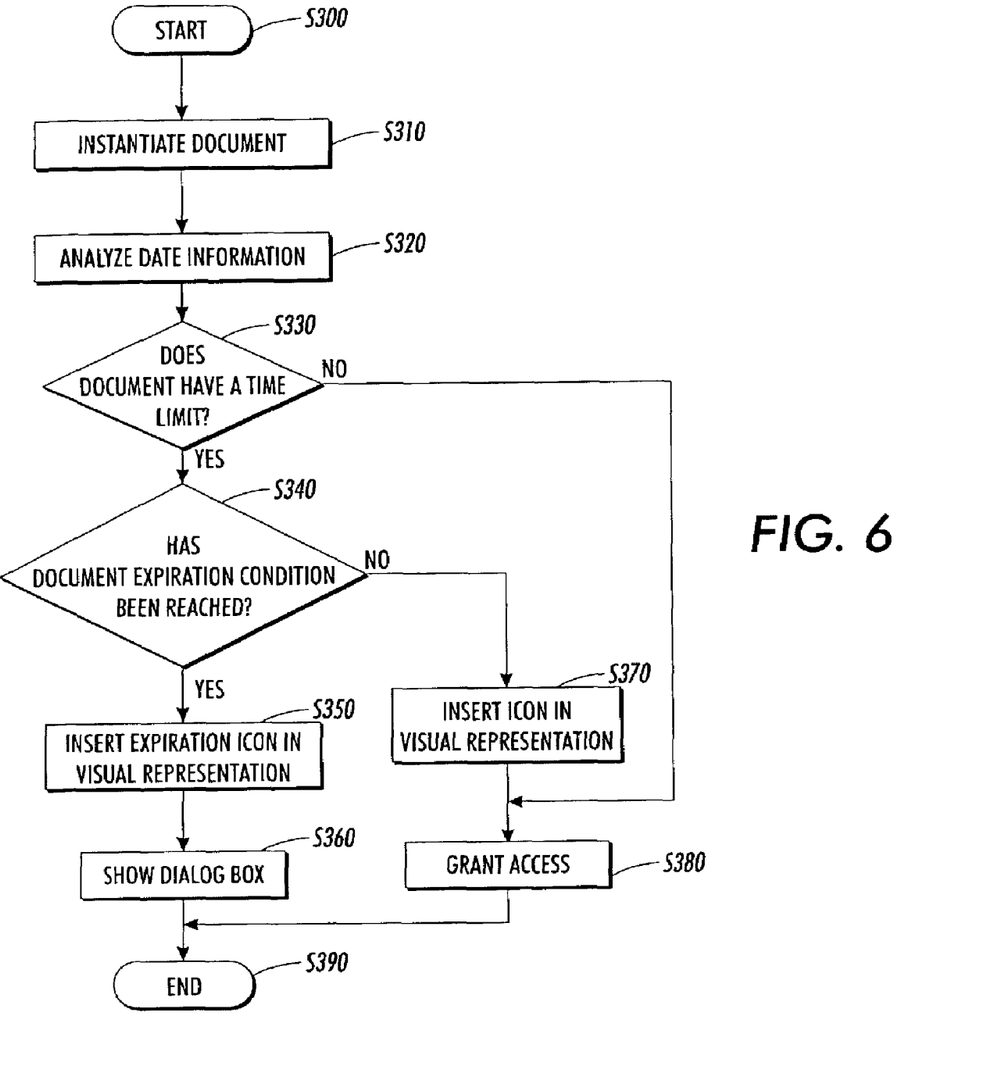
FIG. 6 is a flowchart outlining a third exemplary embodiment of a method according to this invention for limiting the life of an electronic document and representing this end of life visually.

FIG. 6 is a flowchart outlining a third exemplary embodiment of a method of limiting the life of an electronic document and representing this end of life visually. The method outlined in FIG. 6 is similar to that outlined in FIG. 4. As shown in FIG. 6, operation begins in step S300, and continues to step S310, where an electronic document is instantiated. Then, in step S320, date information associated with the electronic document is analyzed. Next, in step S330, a determination is made as to whether the document has a time limit. If a negative determination is made in step S330, then operation jumps to step S380 where access to the document is granted. The process then ends in step S390.

If a positive determination is made in step S330, then operation continues to step S340 where a determination is made as to whether the document expiration condition has been reached. If a negative determination is made in step S340, then operation jumps to step S370 where an active document view is shown. The active document view may include an informational icon is inserted into the visual representation of the electronic document. Next, operation continues to step S380 where the user is granted access to the electronic document. Then, in step S390, the process ends.

If a positive determination is made in step S340, then operation continues to step S350 where an expiration document view is shown. The expiration document view may include an expiration icon is inserted into the visual representation of the electronic document. Then, in step S360, the informational dialog box 200 is shown to the user. Operation then jumps to step S390 where the process ends.

In one embodiment, the user continues to have read privileges to the document after the expiration condition has been reached. The expiration event is indicated to the user by the insertion of a separate expiration icon in step S350 and the launch of the dialog box 200 in step S360.

Figure 7:
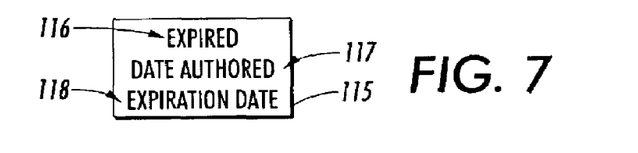
FIG. 7 shows an expiration icon according to an embodiment of this invention.

FIG. 7 illustrates an expiration icon 115 in accordance with various exemplary embodiments of the present invention. The expiration icon 115 is similar to the informational icon 110 shown in FIG. 2. The expiration icon 115 contains "date authored" information 117 and "expiration date" information 118 which is based on the field 112 and 113 of the icon 110. However, the expiration icon contains an expiration alert 116 that is visually different from the information alert 111 of the icon 110.

In a fourth exemplary embodiment of the invention, the screen representation of the electronic document progressively changes to resemble crumpled and/or damaged paper as the expiration date approaches. When the expiration date is reached, the document becomes illegible. The aging process employs visual metaphors to create the impression of document decrepitude. In various exemplary embodiments, these visual metaphors include, for example crumpling, tearing, cracking, yellowing, staining, fading, folding and/or disjointed text. The display function may be provided by a plug-in module to the document viewer application. Alternatively, the display function may be provided by a separate computer program accompanying the electronic document. The display function may also be implemented at a website when the document is viewed through a browser. A different aging rate may be set for each user through the use of cookies.

Figure 8:
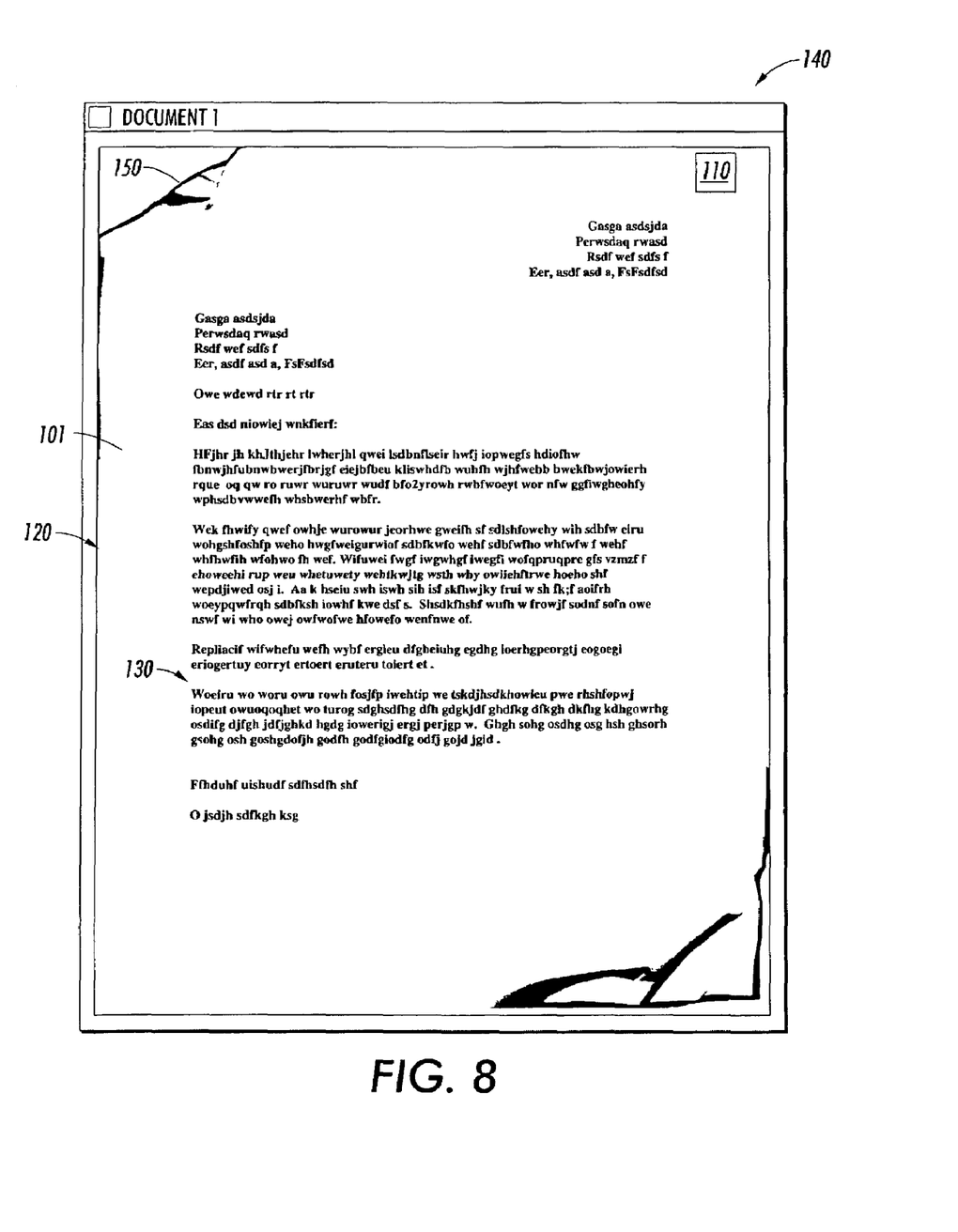
FIG. 8 illustrates a first stage of an aged visual document representation according to a fourth embodiment of this invention.

FIGS. 8-11 illustrate an example of an incremental aging representation of an electronic document in accordance with the fourth exemplary embodiment. In FIG. 8, a first stage 101 of the aged document 100 is displayed in a window 140. The first stage 101 is substantially identical to the document 100. In particular, the first stage 101 includes the edges 120 and the textual information 130. In various exemplary embodiments, the informational icon 110 is inserted into the screen representation of the first stage 101. However, the damaged document 101 has a damaged corner 150 exhibiting crumpling or tear.

Figure 9:
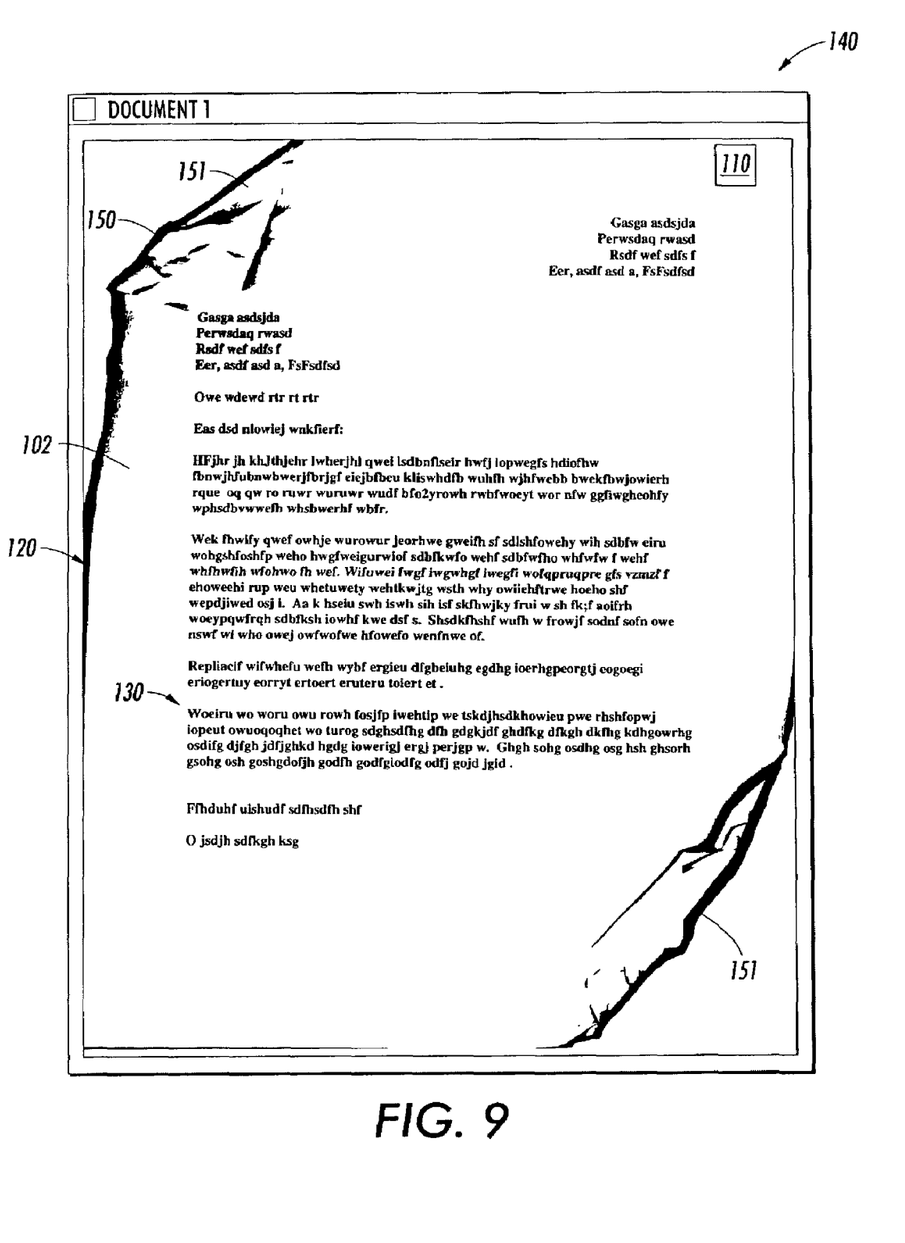
FIG. 9 illustrates a second stage of the aged visual document representation according to the fourth embodiment of this invention.

In FIG. 9, a second stage 102 of the aged document 100 is displayed in the window 140. The second stage 102 is substantially similar to the first stage 101. However, the second stage 102 is more aged than the first 101, and therefore displays one or more damaged corners 151 exhibiting crumpling and/or folding in addition to the damaged corner 150.

Figure 10:
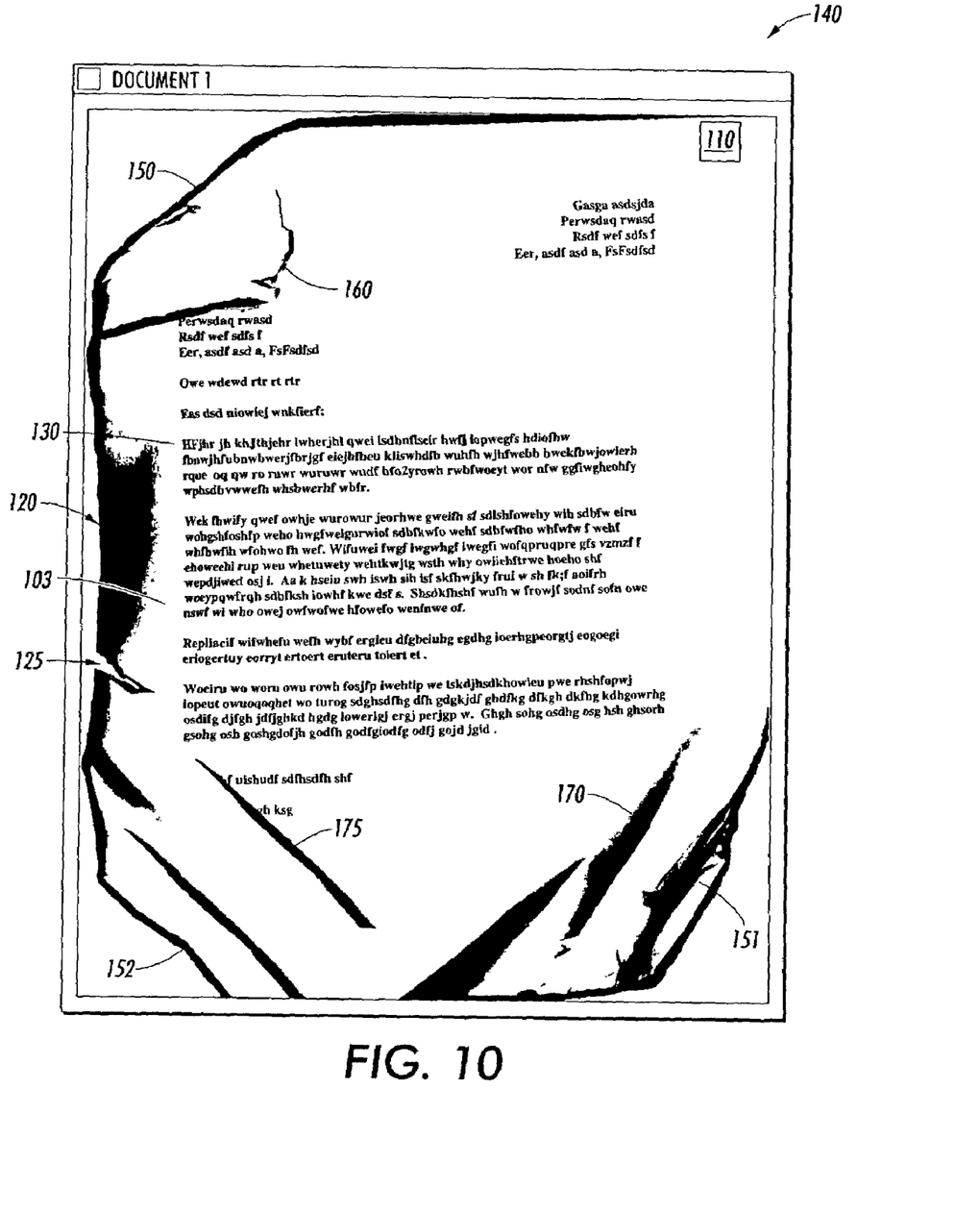
FIG. 10 illustrates a third stage of the aged visual document representation according to the fourth embodiment of this invention.

FIG. 10 shows a third stage 103 that is older than the second stage 102. In the third stage 103 of the aged document 100, the damaged edges at 150 and 151 exhibit noticeable decrepitude. For example, the corner at 150 shows a fold 160 in addition to crumpling and the corner at 151 shows advanced crumpling. Moreover, another corner at 152 displays crumpling as well. In the third stage 103, the corner at 150 partially obscures the textual information 130. The third stage 103 may further include a damaged edge 125 showing tearing and cracking. The third stage 103 may include several crumples 170 associated with the damaged edge at 150, and a text covering crumple 175.

Figure 11:
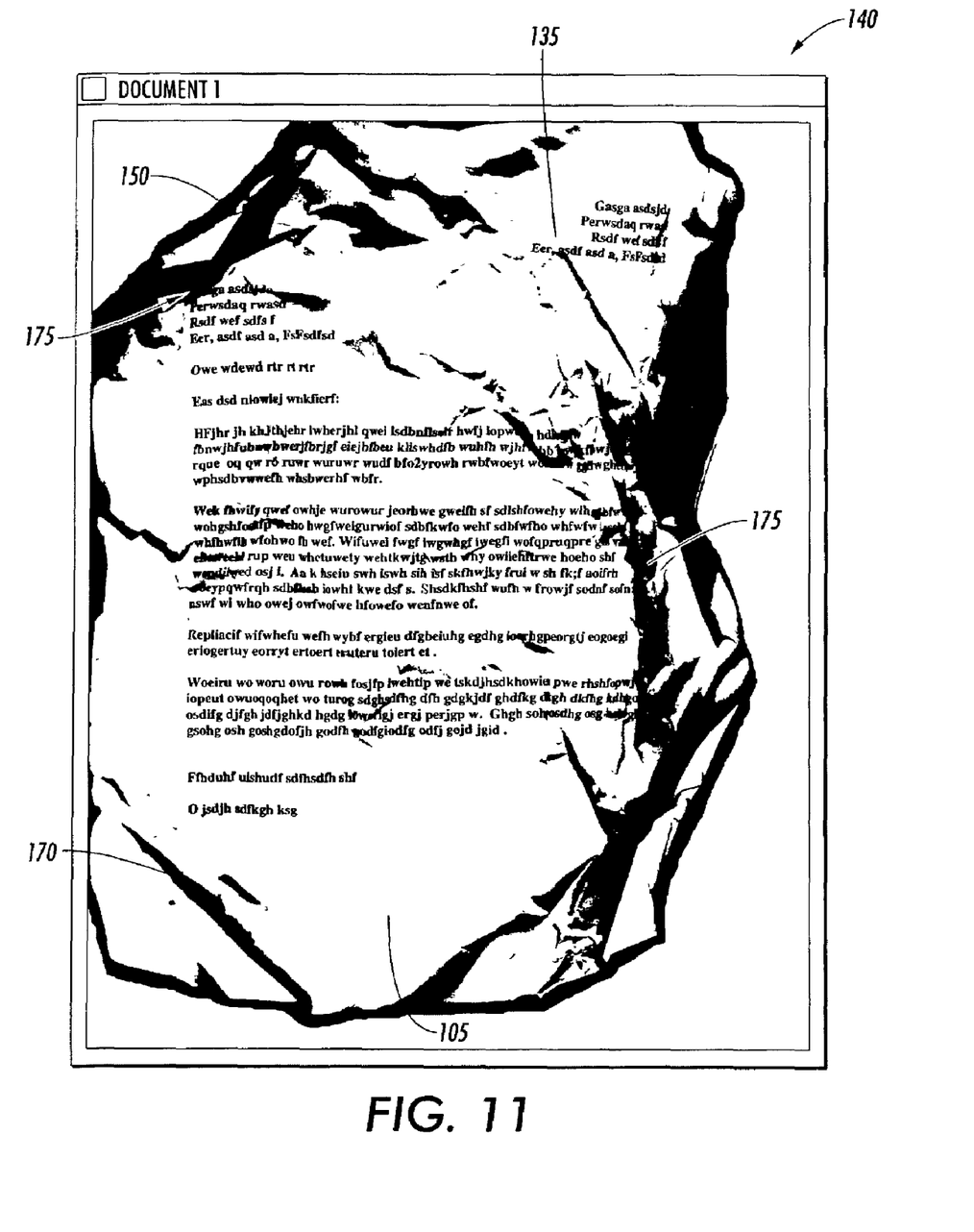
FIG. 11 illustrates an illegible visual document representation according to the fourth embodiment of this invention.

FIG. 11 illustrates a substantially illegible document stage 105. The illegible document stage 105 incorporates several aging metaphors. In particular, the stage 105 displays disjointed text 135. The document representation also incorporates the crumpling or tear 150, crumples 170 and text covering crumples 175. In one embodiment, the illegible document stage 105 also incorporates the expiration icon 115 into the visual representation.

Figure 12:
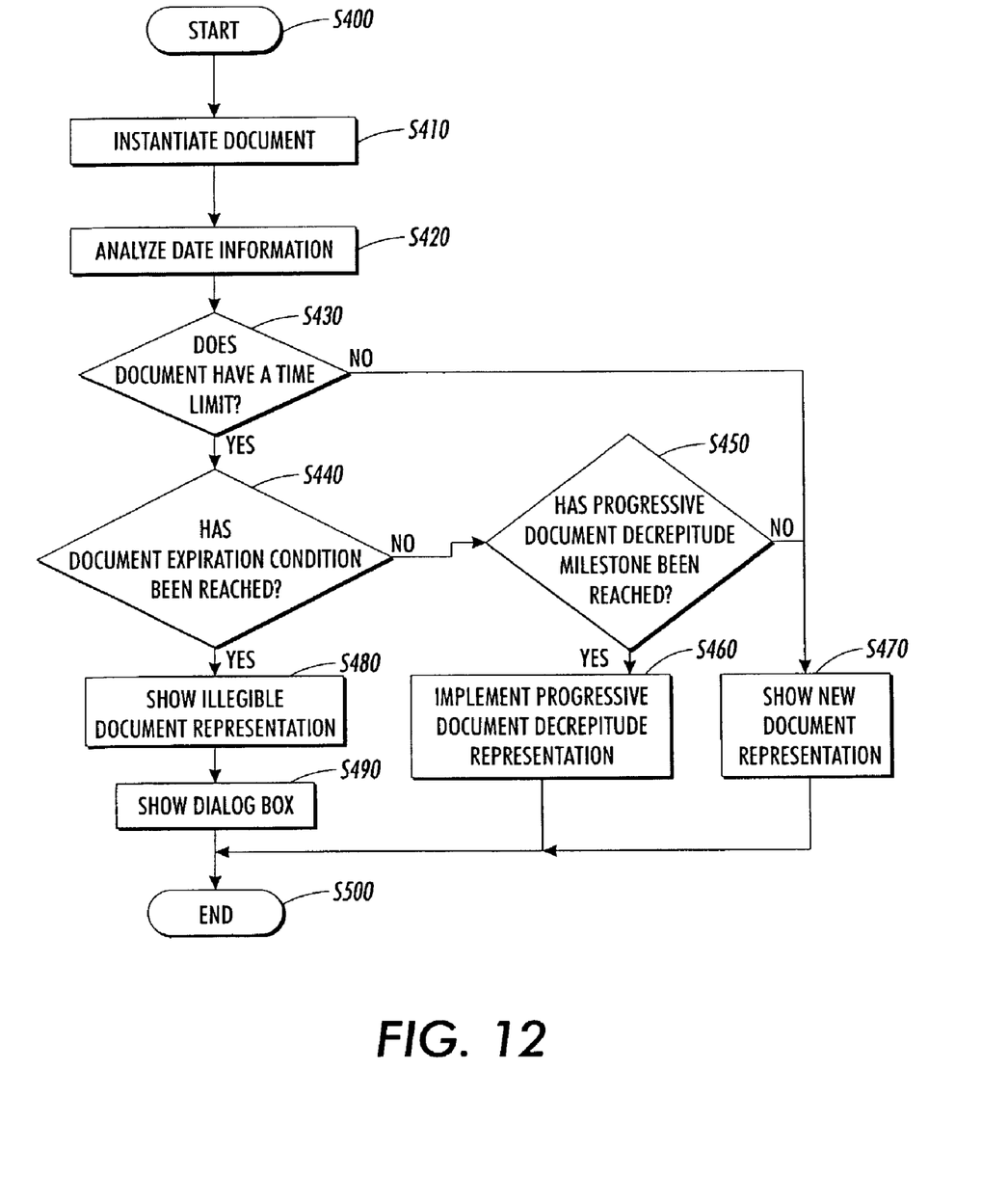
FIG. 12 is a flowchart outlining an exemplary embodiment of a method according to the fourth embodiment of this invention.

FIG. 12 is a flowchart illustrating an exemplary embodiment of a method according to the fourth exemplary embodiment of the invention. As shown in FIG. 12, operation begins in step S400, and continues to step S410, where an electronic document is instantiated. Then, in step S420, date information associated with the electronic document is analyzed. Next, in step S430, a determination is made as to whether the document has a time limit. If a negative determination is made in step S430, then operation jumps to step S470 where a new document representation is displayed to the user. Operation then jumps to step S500 where the process ends.

If a positive determination is made in step S430, then operation continues to step S440 where a determination is made as to whether the document expiration condition has been reached. If a positive determination is made in step S440, then operation jumps to step S480, where an illegible document representation is selected and shown to the user. An example of an illegible document representation according to various exemplary embodiments is illustrated by the illegible document stage 105 in FIG. 11. Next, in step S490, an informational dialog box is shown to the user. Operation continues to step S500 where the process ends.

If a negative determination is made in step S440, then operation continues to step S450 where a determination is made as to whether a progressive document decrepitude milestone has been reached. In various exemplary embodiments, a progressive document decrepitude milestone is an elapsed period of time at which the document's screen representation begins to show decrepitude.

If a negative determination is made in step S450, then operation jumps to step S470, and a new document representation is shown to the user. If a positive determination is made in step S450, then operation continues to step S460, where a progressive document decrepitude representation is selected. In step S460, the visual representation of the document shows a progressive aging in accordance with the time that has elapsed since the progressive document decrepitude milestone was reached and the time remaining to the expiration date. In various exemplary embodiments, progressive document decrepitude is implemented by a routine generating random pixels over time. In still other various exemplary embodiments, progressive document decrepitude is implemented by a routine selecting a set of decrepitude templates or bitmaps, and inserting the templates or bitmaps either in front of the viewable area of the document, or as a background. The templates or bitmaps may be developed for specific document sizes and/or orientations. Alternatively, the templates or bitmaps may be scalable. As the document continues to age, successive templates may replace previous templates, or may be added to them. Thus, additional aging may be created through a process of layering templates. In various exemplary embodiments, the electronic document may be mapped onto one or more templates. The application of the set of templates to the document may be periodic in nature, and the period may be determined by the total time between the milestone and the expiration date.

After step S460, operation jumps to step S500 where the process ends.

Figure 13:
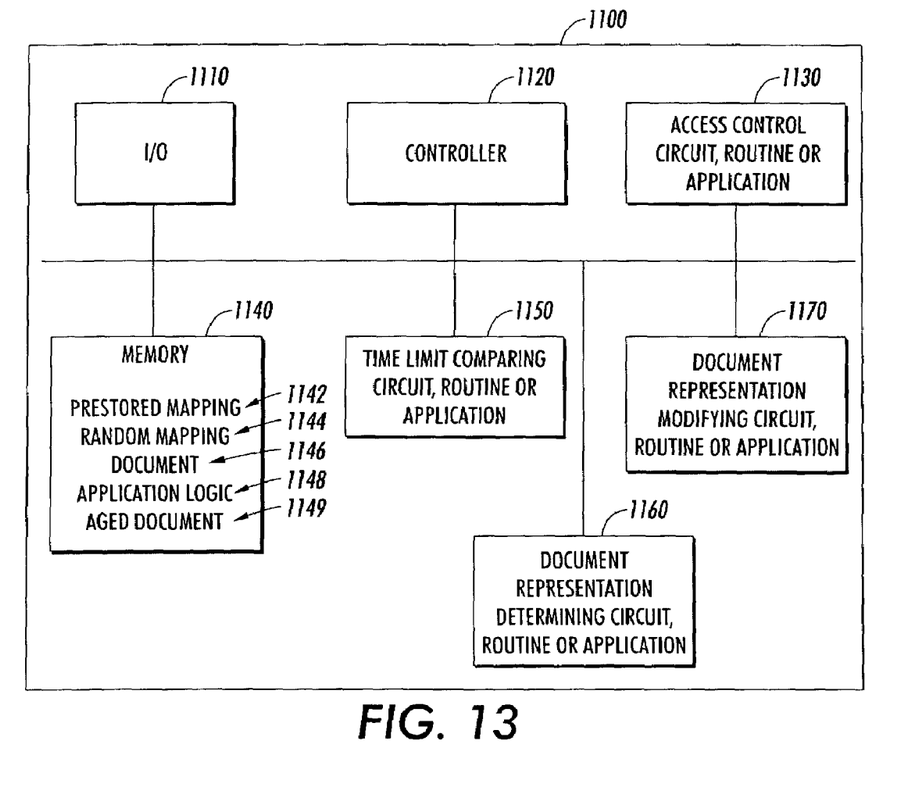
FIG. 13 is a block diagram showing an embodiment of a system according to this invention that limits the life of an electronic document and represents this end of life visually.

FIG. 13 shows an exemplary embodiment of a system 1100 that limits the life of an electronic document and represents this end of life visually. As shown in FIG. 13, the system 1100 includes an input/output interface 1110, a controller 1120, a memory 1140, an access control routine or application 1130, a time limit comparing routine or application 1150, a document representation determining routine or application 1160, and a document representation modifying routine or application 1170, each interconnected by one or more data/control buses or application programming interfaces 1180.

The memory 1140 includes one or more of a prestored mapping portion 1142, a random mapping portion 1144, an original electronic document data portion 1146, an application logic portion 1148, and an aged document representation portion 1149. The prestored mapping portion 1142 stores any bitmap representations of document aging parts and aged document maps. Thus, prestored mapping portion 1142 may store bitmaps, for example, of the crumpling or tear 150, the damaged edge 125, the fold 160, and the crumples 170, as illustrated in FIGS. 5-8. The prestored mapping portion 1142 may also store one or more aged document masks incorporating the bitmaps. The random mapping portion 1144 stores any randomly generated aging bitmaps and any randomly generated document maps. The document portion 1146 stores the original representation of the electronic document, including all formatting codes and file descriptors. The application logic portion 1148 stores the program instructions necessary to implement various exemplary embodiments of the invention. The aged document portion 1149 stores any aged document representations resulting from the application of any prestored mappings or random mappings to the original document.

The memory 1140 may be a computer-readable storage medium, and can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writeable or re-writeable optical disk and disk drive, a hard drive, flash memory or the like. Similarly, the non-alterable or fixed memory can be implemented using any one or more of ROM, PROM, EPROM, and EEPROM, an optical ROM disk, such as CD-ROM or DVD-ROM disk, and disk drive or the like.

Each of the routines or applications shown in FIG. 13 can be implemented as portions of a suitably programmed general purpose computer. Alternatively, each of the routines or applications shown in FIG. 13 can be implemented as physically distinct hardware circuits within an ASIC, or using an FPGA, a PDL, a PLA or a PAL, a digital signal processor, for using discrete logic elements or discrete circuit elements. The particular form each of the routines or applications shown in FIG. 13 will take is a design choice and will be obvious and predictable to those skilled in the art.

In operation, the input/output interface 1110 receives a request to view an electronic document from a user. The electronic document may be located, for example, on a networked server or on a hard drive local to the user's computer.

The controller 1120 then executes the electronic document viewing application. A copy of the electronic document may be instantiated in memory 1140 at the document data portion 1146. Next, the time limit comparing routine or application 1150 determines whether the electronic document stored in the document data portion 1146 has an expiration date and whether that expiration date has passed. If the document has an expiration date, then the document representation determining routine or application 1160 determines a prestored mapping stored in the prestored mapping portion 1142 or a random mapping stored in the random mapping portion 1144 on which to map the original document stored in the document data portion 1146. Then, the document representation modifying routine or application 1170 maps the initial document according to the mapping located in the prestored mapping portion 1142 or the random mapping portion 1144 to produce an aged document representation stored in aged document representation portion 1149. Then the input/output interface 1110 displays the aged document in a window. In one embodiment the access control, routine or application 1130 alters the file access codes so that the user cannot access the file after the expiration date.

In the various exemplary embodiments outlined above, the system 1100 can be implemented using a programmed general purpose computer. However, the system 1100 can be implemented using a special purpose computer, a programmed microprocessor or microcontroller and peripheral integrated circuit elements, and ASIC or other integrated circuit, a digital signal processor, a hardware electronic or logic circuit, such as a discrete element circuit, a programmable logic device, such as PLD, PLA, FPGA or PAL or the like. In general, any device, capable of implementing a finite state machine that is in turn capable of implementing one or more of the flowcharts shown in FIGS. 3, 4, 6 and 12, can be used to implement the system 1100.

Moreover, the various exemplary embodiments of the system 1100 outlined above and/or each of the various elements discussed above can be implemented as software routines, managers or objects executing on a programmed general purpose computer, a special purpose computer, a microprocessor or the like. In this case, the various exemplary embodiments of the system 1100 and/or each of the various elements discussed above can each be implemented as one or more routines embedded in the communication network, as a resource residing on a server, as a resource of a printer driver, or the like. The various exemplary embodiments of the system 1100 and the various routines discussed above can also be implemented by physically incorporating one or more of system 1100 into a software and/or hardware system such as the hardware and software system of a web server or a client device.

It should be appreciated that, in FIGS. 2, 5 and 7-11, the various icon and/or bitmaps can be implemented by one or more software objects that can be reused and instantiated with different sets of displayed data. Thus, the various screens of this invention can be easily provided with little programming overhead.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for implementing an expiration condition of an electronic document, comprising:
   determining an expiration condition for the electronic document;
   comparing the expiration condition with a reference condition to determine if the expiration condition has been reached;
   displaying on an electronic display an expiration document view as a visual metaphor of a document physical decrepitude of the electronic document when the comparison of the expiration condition with the reference condition indicates that the expiration condition has been reached; and
   displaying on an electronic display an active document view as a visual metaphor of a document physical decrepitude of the electronic document when the comparison of the expiration condition with the reference condition indicates that the expiration condition has not been reached;
   displaying on an electronic display, if the expiration condition has been reached, an expiration document view as a visual metaphor of a document physical decrepitude of the electronic document; and
   displaying on the electronic display, if the expiration condition has not been reached, an active document view including a progressive document decrepitude view determined based on a comparison of the reference condition with a determined progressive document decrepitude milestone of the document,
   wherein the visual metaphor of the document physical decrepitude is fixed in space on the electronic document.

2. The method of claim 1, wherein the expiration condition comprises an expiration date, the reference condition comprises a current date, and the comparison of the expiration condition with the reference condition indicates that the current date meets or exceeds the expiration date.

3. The method of claim 1, further comprising embedding an informational icon into a visual representation of the document when displaying the active document view.

4. The method of claim 1, wherein when the comparison of the expiration condition with the reference condition indicates that the expiration condition has been reached, the step of displaying an expiration document view comprises the step of embedding an expiration icon into a visual representation of the document.

5. The method of claim 1, wherein the progressive document decrepitude milestone comprises a date before the expiration date, and the comparison of the milestone with the reference condition indicates that the current date meets or exceeds the milestone.

6. The method of claim 5, wherein the step of displaying a progressive decrepitude view comprises at least one of incrementally adding random pixels to a visual representation of the document and incrementally adding a decrepitude bitmap to a visual representation of the document.

7. The method of claim 6, further comprising mapping a visual representation of the document to the decrepitude bitmaps.

8. A system for implementing an expiration condition for an electronic document, comprising:
   at least one processor that executes:
   a time limit comparing routine that compares an expiration date of the electronic document with a current date to determine if the current date exceeds the expiration date; and
   an access control routine that causes, based on a determination that the current date exceeds the expiration date, a document representation determining routine to select a first illegible decrepitude representation for display on an electronic display of a visual metaphor of a document physical decrepitude of the document when the current date exceeds the expiration date; and
   the access control routine causes, based on a determination that the current date does not exceed the expiration date, the document representation determining routine to select a progressive document decrepitude representation for display on the electronic display of a visual metaphor of a document physical decrepitude of the document based on a comparison of the current date with a determined progressive document decrepitude milestone of the document,
   wherein the visual metaphor of the document physical decrepitude is fixed in space on the electronic document.

9. The system of claim 8, further comprising:
   a document representation determining routine that selects a second decrepitude representation; and
   a document representation modifying routine that applies the second decrepitude representation to the document representation.

10. The system of claim 9, wherein the document representation determining routine selects from a set of decrepitude bitmaps.

11. The system of claim 10, wherein the document modifying routine maps the document representation to the decrepitude bitmaps selected by the document representation determining routine.

12. A computer readable storage medium, comprising:
    instructions for determining an expiration condition for an electronic document;
    instructions for comparing the expiration condition with a reference condition to determine if the expiration condition has been reached;

instructions for displaying on an electronic display an expiration document view as a visual metaphor of a document physical decrepitude of the electronic document when the comparison of the expiration condition with the reference condition indicates that the expiration condition has been reached; and instructions for displaying on the electronic display an active document view as a visual metaphor of a document physical decrepitude of the electronic document when the comparison of the expiration condition with the reference condition indicates that the expiration condition has not been;

instructions for displaying on an electronic display, if the expiration condition has been reached, an expiration document view as a visual metaphor of a document physical decrepitude of the electronic document; and instructions for displaying on the electronic display, if the expiration condition has not been reached, an active document view including a progressive document decrepitude view determined based on a comparison of the reference condition with a determined progressive document decrepitude milestone of the document, wherein the visual metaphor of the document physical decrepitude is fixed in space on the electronic document.

13. The computer readable storage medium of claim 12, wherein the expiration condition comprises an expiration date, the reference condition comprises a current date, and the comparison of the expiration condition with the reference condition indicates that the current date meets or exceeds the expiration date.

14. The computer readable storage medium of claim 12, further comprising instructions for embedding an informational icon into a visual representation of the document when displaying the active document view.

15. The computer readable storage medium of claim 12, further comprising instructions for embedding an expiration icon into a visual representation of the document when displaying the expiration document view when the comparison of the expiration condition with the reference condition indicates that the expiration condition has been reached.

16. The computer readable storage medium of claim 12, wherein the progressive document decrepitude milestone comprises a date before the expiration date, and the comparison of the milestone with the reference condition indicates that the current date meets or exceeds the milestone.

17. The computer readable storage medium of claim 16, wherein the instructions for displaying a progressive decrepitude view comprise at least one of instructions for incrementally adding random pixels to a visual representation of the document and instructions for incrementally adding a decrepitude bitmap to a visual representation of the document.

18. The computer readable storage medium of claim 17, further comprising instructions for mapping a visual representation of the document to a decrepitude bitmap.

* * * * *